No. 781,117. PATENTED JAN. 31, 1905.
A. B. WILLITS.
DRAFTSMAN'S RULE.
APPLICATION FILED NOV. 4, 1904.

WITNESSES:
Jas. Nelson Alexander.
Rob. D. Kinney

INVENTOR:
Albert B. Willits

No. 781,117. Patented January 31, 1905.

UNITED STATES PATENT OFFICE.

ALBERT B. WILLITS, OF THE UNITED STATES NAVY.

DRAFTSMAN'S RULE.

SPECIFICATION forming part of Letters Patent No. 781,117, dated January 31, 1905.

Application filed November 4, 1904. Serial No. 231,414.

*To all whom it may concern:*

Be it known that I, ALBERT BOWER WILLITS, of the United States Navy, a citizen of the United States, residing in the city and county of Philadelphia and State of Pennsylvania, have invented a new and useful Improvement in Draftsmen's Rules, of which the following is a specification.

My invention relates to tools used by draftsmen and others whose employment involves the use of similar tools; and it consists of a rule in which one of the edges thereof is combined with a plane, preferably placed at right angles to the flat side of the rule, and having such plane provided with a reflecting-surface for the purpose of utilizing the reflected image of lines previously drawn in the progress of the work in hand and by means of which reflection a line can be readily and accurately drawn at right angles to the line so reflected, or the lines of any plane angle may in like manner be readily and accurately bisected, or a circle may in like manner be readily and accurately divided by diameters or its center quickly found and all this without the use of T-square, triangle, or other draftsman-tool as usually used for doing such work. I attain these results by such a rule as is illustrated in the accompanying drawings, in which—

Figure 1:
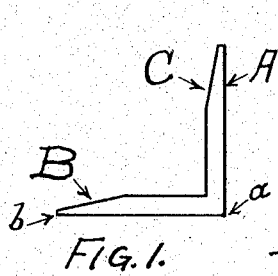
Figure 2:
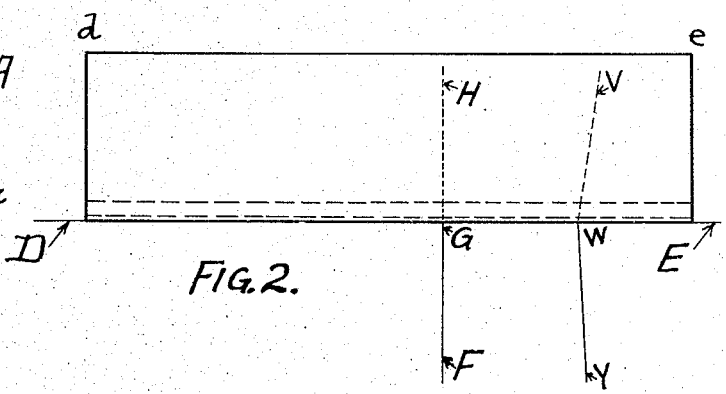
Figure 3:
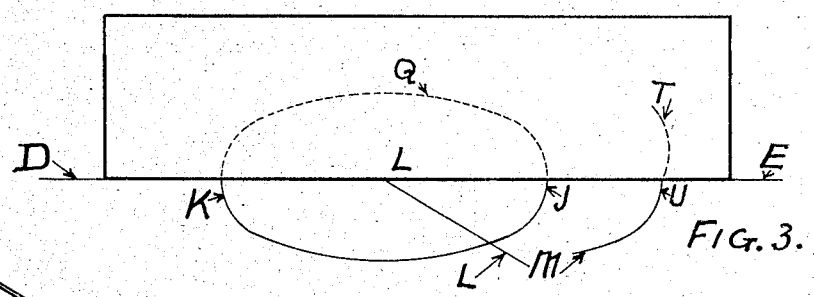
Figure 4:
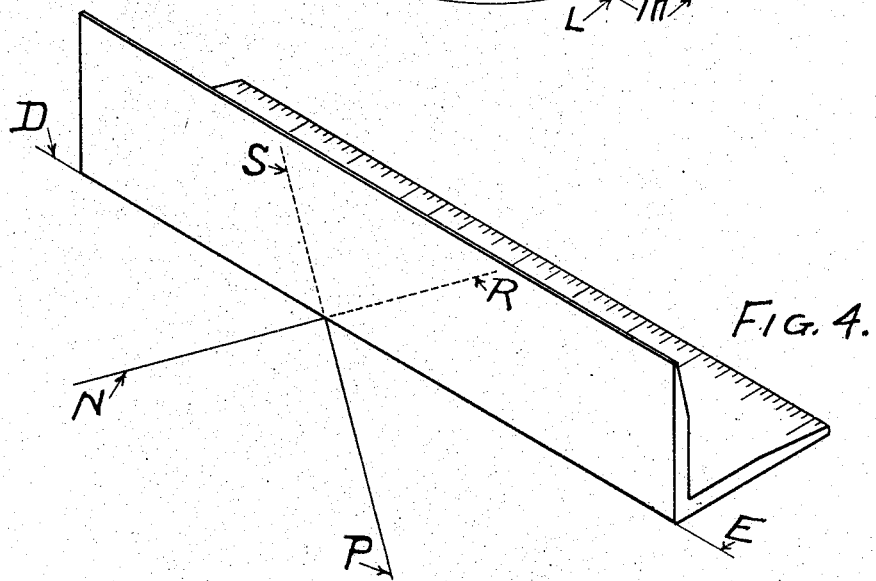

Figure 1 is an end view of my improved rule. Figs. 2 and 3 are front views, and Fig. 4 is an isometrical view of the same.

Similar letters refer to similar parts in all the figures.

Referring to Fig. 1, the angle A *a b* is a right angle, the edge *a* is a straight edge, and the vertical face A, which comprises the surface D E *e d* of Fig. 2, is a plain reflecting-surface.

To use the rule for drawing a line at right angles to one previously drawn—as line F G of Fig. 2, for instance—the exposed part of such line will appear reflected in such reflecting-surface, as indicated by the dotted line G H or as V W from the line W Y in the same figure, which reflection when brought in line with the exposed line G F, as in the case of the reflection H G, will locate the edge of the rule at right angles to such reflected line, and a line drawn along this edge, as the line D E, will be found to be at right angles to the line F G. It will be found that the least deviation of the edge D E from a right angle with the previously-drawn line will be indicated by the reflected image being out of line with same, as shown by the line W Y and its reflected image V W. Similarly if the rule is placed so that the reflected image of the exposed part of a circle makes a fair and true circle with that exposed part, as shown in Fig. 3, the edge D E lies on a diameter of the circle and passes through its center, so that a line traced along the edge of the ruler will be a diameter, and thus by striking two different diameters, as is shown by the lines L L and D E, the point L of their intersection will be found to be the center of the circle K J, in which Q is the reflection of same. The least deviation of the edge D E from a true diameter of the circle K J will be indicated by a want of symmetry in the reflected image with the exposed line so reflected—for instance, as is shown by the line T U, indicating the reflection of the line M U. Similarly, also, if the rule is placed so that the image of the exposed part of any two intersecting straight lines—as, for instance, as shown by S R in Fig. 4—are in line with the exposed part of the other of these lines, N P, the edge D E will direct a line which accurately bisects that angle made by the intersection of the lines in which the edge D E lies.

It is obvious that the usefulness of my said rule is increased by having its edges B and C graduated with a scale for measuring purposes, as is shown on the one edge of the rule illustrated by Fig. 4.

Having thus shown and described my said invention and illustrated instances of its application to practical uses, what I claim is—

1. A rule composed of two flanges placed in planes at right angles to each other, with the exterior side or face of one or of both of said flanges provided with a surface that will reflect the image of lines drawn on a surface lying in a plane with the exterior side or face of the other of said flanges; all substantially as and for the purposes shown and described.

2. A rule composed of two flanges placed in planes at right angles to each other, with the exterior side or face of one or of both of said flanges provided with a surface that will reflect the image of lines drawn on a surface lying in a plane with the exterior side or face of the other of said flanges, and having the interior side or face of one or both of said flanges provided with a measuring-scale; all substantially as and for the purposes shown and described.

In testimony whereof I have signed my name to this specification in the presence of two subscribing witnesses.

ALBERT B. WILLITS.

Witnesses:
JAS. NELSON ALEXANDER,
ROBT. D. KINNEY.